US010523059B2

(12) United States Patent
Moffatt et al.

(10) Patent No.: US 10,523,059 B2
(45) Date of Patent: Dec. 31, 2019

(54) WIRELESS POWER TRANSFER TO MULTIPLE RECEIVER DEVICES ACROSS A VARIABLE-SIZED AREA

(71) Applicants: Robert A. Moffatt, Palo Alto, CA (US); Jeffrey J. Yen, Palo Alto, CA (US)

(72) Inventors: Robert A. Moffatt, Palo Alto, CA (US); Jeffrey J. Yen, Palo Alto, CA (US)

(73) Assignee: Etherdyne Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/032,359

(22) Filed: Jul. 11, 2018

(65) Prior Publication Data

US 2018/0366991 A1    Dec. 20, 2018

Related U.S. Application Data

(62) Division of application No. 15/296,704, filed on Oct. 18, 2016, now Pat. No. 10,250,078.

(51) Int. Cl.
*H02J 50/20* (2016.01)
*H02J 7/02* (2016.01)

(52) U.S. Cl.
CPC ............. *H02J 50/20* (2016.02); *H02J 7/025* (2013.01)

(58) Field of Classification Search
CPC .. H02J 50/12; H02J 50/40; H02J 50/20; H02J 5/005; H02J 7/025; H02J 17/00; H04B 5/0037; H04B 5/0081; H01F 38/14
USPC ......................................................... 307/104
See application file for complete search history.

*Primary Examiner* — Carlos Amaya
(74) *Attorney, Agent, or Firm* — Thomas | Horstemeyer, LLP

(57) ABSTRACT

A wireless power receiver is described that receives power wirelessly from a transmitter coil that generates an oscillating magnetic field. The wireless power receiver includes a receiving coil circuit having a diode string formed by an outer wire, an inner wire, and diodes. Each of the diodes include a first end coupled to the outer wire and a second end coupled to the inner wire such that each of the diodes are connected in parallel with one another. A rectifier circuit is coupled to ends of the diode string. The rectifier circuit includes capacitors and rectifying diodes, where at least one of the capacitors is configured to bring the diode string into resonance with the oscillating magnetic field. The rectifying diodes rectify the induced oscillating voltage to produce a DC voltage difference between the outer wire and the inner wire, thereby powering the diodes.

20 Claims, 11 Drawing Sheets

WIRELESS POWER TRANSFER TO MULTIPLE RECEIVER DEVICES ACROSS A VARIABLE-SIZED AREA

CROSS-REFERENCE TO RELATED APPLICATION

This application is a divisional of and claims priority to U.S. patent application Ser. No. 15/296,704, entitled "WIRELESS POWER TRANSFER TO MULTIPLE RECEIVER DEVICES ACROSS A VARIABLE-SIZED AREA," filed Oct. 18, 2016, the entire contents of which are hereby incorporated herein by reference.

BACKGROUND

Wireless power transfer is the transmission of electrical energy from a power source to an electrical load without the use of man-made conductors to connect the power source to the electrical load. A wireless power transfer system consists of a transmitter and one or more receiver devices. The transmitter is connected to a source of power and converts the power to a time-varying electromagnetic field. The one or more receiver devices receive the power via the electromagnetic field and convert the received power back to an electric current to be utilized by the electrical load.

SUMMARY

In general, in one aspect, the invention relates to a method for wireless power transfer. The method includes adapting a variable form factor transmitter into an adapted form factor based on a pre-determined wireless power transfer area, wherein the variable form factor transmitter in the adapted form factor comprises a characteristic frequency, maintaining the characteristic frequency to be substantially independent of the adapted form factor, and transmitting, from a radio frequency (RF) power source and based at least in part on the characteristic frequency, RF power across the pre-determined wireless power transfer area via a near electromagnetic field of the variable form factor transmitter.

In general, in one aspect, the invention relates to a variable form factor transmitter for wireless power transfer. The variable form factor transmitter includes a plurality of capacitors each with a pre-determined capacitance and a plurality of wire segments each with a pre-determined segment length and a predetermined inductance per unit length, wherein the plurality of capacitors are connected in series via at least the plurality of wire segments into a string of distributed capacitors, wherein the string of distributed capacitors is adaptable into an adapted form factor based on a pre-determined wireless power transfer area, wherein the string of distributed capacitors in the adapted form factor comprises a characteristic frequency that is substantially independent of the adapted form factor, and wherein the variable form factor transmitter is configured to transmit, from a radio frequency (RF) power source and based at least in part on the characteristic frequency, RF power across the pre-determined wireless power transfer area via a near electromagnetic field of the string of distributed capacitors.

In general, in one aspect, the invention relates to a system for wireless power transfer. The system includes a radio frequency (RF) power source and a variable form factor transmitter adaptable into an adapted form factor based on a pre-determined wireless power transfer area, wherein the variable form factor transmitter in the adapted form factor comprises a characteristic frequency, and wherein the variable form factor transmitter is configured to maintain the characteristic frequency to be substantially independent of the adapted form factor and transmit, from the RF power source and based at least in part on the characteristic frequency, RF power across the pre-determined wireless power transfer area via a near electromagnetic field of the variable form factor transmitter.

Other aspects of the invention will be apparent from the following transaction description and the appended claims.

DETAILED DESCRIPTION

Figure 1A:
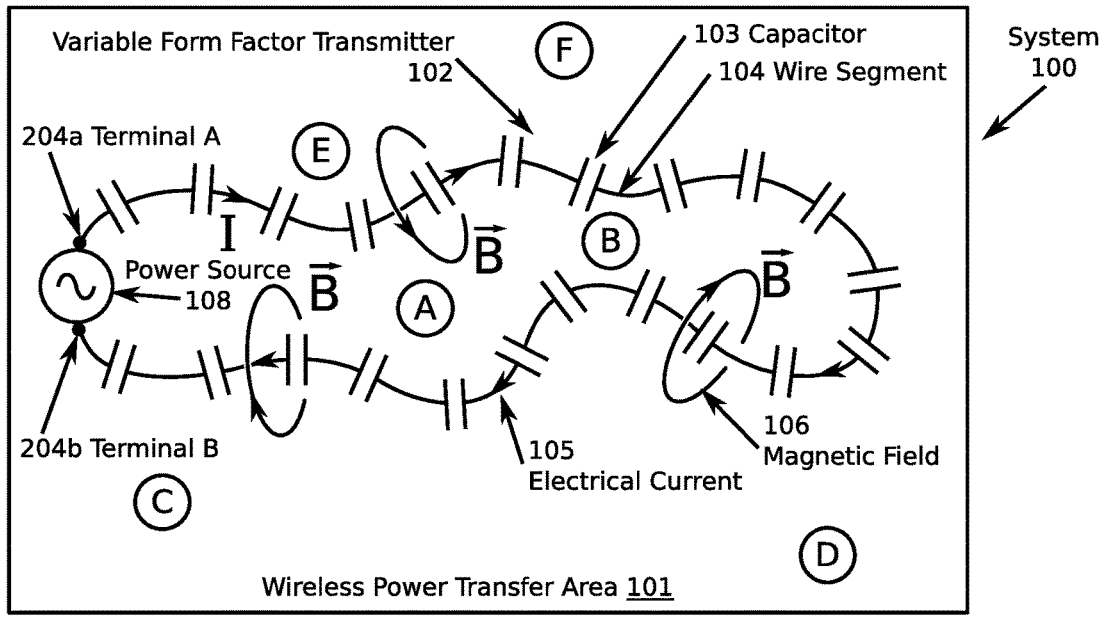
FIGS. 1A, 1B, and 1C show schematic diagrams of an example system having a variable form factor transmitter in accordance with one or more embodiments of the invention.

Specific embodiments of the invention will now be described in detail with reference to the accompanying figures. Like elements in the various figures are denoted by like reference numerals for consistency. Further, in the figures, three or more collinear dots mean that more elements of the same type as before the three or more collinear dots may optionally exist in accordance with one or more embodiments of the invention.

In the following detailed transaction description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the transaction description.

In general, embodiments of the invention provide a method, a transmitter device, and a system for wireless power transfer. In one or more embodiments of the invention, the method, transmitter device, and system provide the functionality for adapting a variable form factor transmitter into a particular form factor (referred to as the adapted form factor) based on a pre-determined wireless power transfer area. In particular, the variable form factor transmitter in the adapted form factor has a characteristic frequency that is maintained to be substantially independent of the adapted form factor. Accordingly, RF power is transmitted, from a radio frequency (RF) power source and based at least in part on the characteristic frequency, across the pre-determined wireless power transfer area via a near electromagnetic field of the variable form factor transmitter. In one or more embodiments of the invention, the characteristic frequency is within the industrial, scientific and medical (ISM) radio band defined by the International Telecommunication Union (ITU) Radio Regulations. For example, the characteristic frequency may be maintained, as the adapted form factor varies, within the type A frequency range (i.e., 6.765 MHz-6.795 MHz) defined in the ITU Radio Regulations Article 5, footnote 5.138.

FIG. 1A shows a schematic diagram of an example system (100) in accordance with one or more embodiments of the invention. In one or more embodiments, one or more of the modules and elements shown in FIG. 1A may be omitted, repeated, and/or substituted. Accordingly, embodiments of the invention should not be considered limited to the specific arrangements of modules shown in FIG. 1A.

As shown in FIG. 1A, the system (100) includes a variable form factor transmitter (102) receiving power from an RF power source (108) for wireless power transfer across a wireless power transfer area (101) having one or more receiver devices (e.g., denoted as circular icons labeled as A, B, C, D, E, and F) disposed therein. Each of these components is described in detail below.

In one or more embodiments of the invention, the wireless power transfer area (101) is any three dimensional (3D) physical space where the one or more receiver devices are receiving power from the variable form factor transmitter (102). For example, the wireless power transfer area (101) may include a 3D space within a building or a vehicle, such as a room, a hallway, a passenger cabin of a car, bus, train, airplane, or space ship, or any portion of the building or vehicle. In another example, the wireless power transfer area (101) may include a 3D space that is not enclosed, such as a play ground, a roadway, an amusement park, or any type of field on the ground, above the ground, or away from the earth in the space (e.g., an atmospheric layer or interstellar space). In yet another example, the wireless power transfer area (101) may include an underground or under-water space, such as a cave, an under water region near an ocean platform or sea bed, etc. In still another example, the wireless power transfer area (101) may include a combination of the examples above.

In one or more embodiments of the invention, the variable form factor transmitter (102) is disposed entirely within the wireless power transfer area (101), overlaps the wireless power transfer area (101), or in the vicinity of the wireless power transfer area (101). In one or more embodiments, at least a portion of the variable form factor transmitter (102) may be inserted in a protective sleeve, embedded in a material sheet, free-standing in the wireless power transfer area (101), or attached to the wireless power transfer area (101). In one or more embodiments, at least a portion of the variable form factor transmitter (102) may be stationery or moving with respect to the wireless power transfer area (101) and/or the one or more receiver devices (e.g., denoted as circular icons labeled as A, B, C, D, E, and F) disposed therein. In one or more embodiments of the invention, the form factor of the variable form factor transmitter (102) is adapted according to a geometric constraint imposed by the wireless power transfer area (101). For example, the variable form factor transmitter (102) may be made of pliable material such that the form factor of the variable form factor transmitter (102) is changed by the user to fit the physical shape of the room, hallway, passenger cabin, play ground, roadway, amusement park, field, cave, under-water region, etc. of the wireless power transfer area (101). For example, the form factor of the variable form factor transmitter (102) may include a 3D portion, such as a curved surface, a helical curve, etc.

In one or more embodiments of the invention, the receiver devices (A) through (F) may be of the same type or of different types that are used by one or more users, such as individual persons. In one or more embodiments, one or more of the receiver devices (A) through (F) are disposed at user specified locations throughout the wireless power transfer area (101) and are stationary during the wireless power transfer. In one or more embodiments, one or more of the receiver devices (A) through (F) have dimensions that are smaller than the dimensions of the wireless power transfer area (101). In one or more embodiments, one or more of the receiver devices (A) through (F) have dimensions that are comparable to or greater than the dimensions of the wireless power transfer area (101). For example, the receiver device (A) may be a lighting device placed on the ceiling of a room or hallway by the user. In one or more embodiments, one or more of the receiver devices (A) through (F) are carried by respective users who move around throughout the wireless power transfer area (101) from time to time during the wireless power transfer. Based on the nature of the near electromagnetic field of the variable form factor transmitter (102), the power of the near electromagnetic field that is not received by any of the receiver device is returned to the variable form factor transmitter (102) and the RF power source (108). This is in contrast to a far electromagnetic field via which power is radiated resulting in energy loss that is not productive for the wireless power transfer. Examples of the receiver device (A), receiver device (B), receiver device (C), receiver device (D), receiver device (E), and receiver device (F) are described in reference to FIGS. 5A, 5B, and 5C below.

In one or more embodiments of the invention, the variable form factor transmitter (102) includes a string of distributed capacitors. In particular, the string of distributed capacitors includes multiple capacitor-wire segments that are connected in series to conduct radio-frequency (RF) electrical current (105) generated by the power source (108). The RF electrical current (105) induces magnetic fields (e.g., magnetic field (106)) that are present throughout the wireless power transfer area (101). In one or more embodiments, the RF electrical current (105) enters/exits the wire at a terminal A (107a) and a terminal B (107b). In one or more embodiments, additional intervening components (not shown) may also be inserted in the series of capacitor-wire segments or inserted between the series of capacitor-wire segments and one or more terminals (e.g., terminal A (107a), terminal B (107b)) without impeding the operation of the variable form factor transmitter (102).

In one or more embodiments, each capacitor-wire segment includes a capacitor (e.g., capacitor (103)) connected to a wire segment (e.g., wire segment (104)). In one or more embodiments, each capacitor (e.g., capacitor (103)) in the variable form factor transmitter (102) has the same nominal capacitance value, as any other capacitor therein, that is determined prior to disposing the variable form factor transmitter (102) in the wireless power transfer area (101). For example, the capacitors (e.g., capacitor (103)) in the variable form factor transmitter (102) may be installed in a factory before a user uses the variable form factor transmitter (102) to provide power wirelessly within the wireless power transfer area (101). The capacitors (e.g., capacitor (103)) may be of a suitable type, such as ceramic capacitors, film and paper capacitors, electrolyte capacitors, polymer capacitors, silver mica capacitors, etc. In one or more embodiments, one or more of the capacitors may include two aluminum or other metallic sheets, foils, or films separated by an aluminum or other metallic oxide layer. As is typical in a factory manufacturing process, the capacitance values of all capacitors (e.g., capacitor (103)) in the variable form factor transmitter (102) may vary within a range (referred to as a capacitance range), e.g., due to a manufacturing tolerance.

In one or more embodiments, each capacitor-wire segment includes a wire segment having a pre-determined segment length and a pre-determined inductance per unit length. For example, the wire segments (e.g., wire segment (104)) in the variable form factor transmitter (102) may be installed in a factory before a user uses the variable form factor transmitter (102) to provide power wirelessly within the wireless power transfer area (101). The wire segments (e.g., wire segment (104)) may be of a suitable type, such as insulated or un-insulated wires, sheets, foil, or films made of copper, aluminum, or other suitable metal and/or alloy material. In one or more embodiments, one or more of the wire segments (e.g., wire segment (104)) are flexible or pliable such that the user may bend, stretch, or otherwise change the shape of the one or more wire segments. As is typical in a factory manufacturing process, the length and inductance values of each and all wire segments (e.g., wire segment (104)) in the variable form factor transmitter (102) may vary within a range (referred to as a length range and an inductance range), e.g., due to a manufacturing tolerance.

In one or more embodiments of the invention, by confining the electrical fields, the capacitors (e.g., capacitor (103)) in the variable form factor transmitter (102) reduce stray electric fields and the resultant induced voltage of the wire segments (e.g., wire segment (104)). Accordingly, the capacitors (e.g., capacitor (103)) in the variable form factor transmitter (102) reduce the fraction of energy stored in the stray capacitance of the wire segments (e.g., wire segment (104)) over the total energy in the system (100). The reduction of both induced voltage and stored energy associated with the stray capacitance reduces loss due to environmental interactions and improves safety for the user.

In one or more embodiments of the invention, the variable form factor transmitter (102) is associated with a characteristic frequency that is based at least on the pre-determined capacitance, the pre-determined segment length, and the pre-determined inductance per unit length. The characteristic frequency of the variable form factor transmitter (102) is described in reference to FIGS. 2A, 2B, 2D, 2E, 3A, 3B, 3C, 3D, and 3E below. Throughout this document, the terms "characteristic frequency" and "resonant frequency" may be used interchangeably depending on context.

Figure 1B:
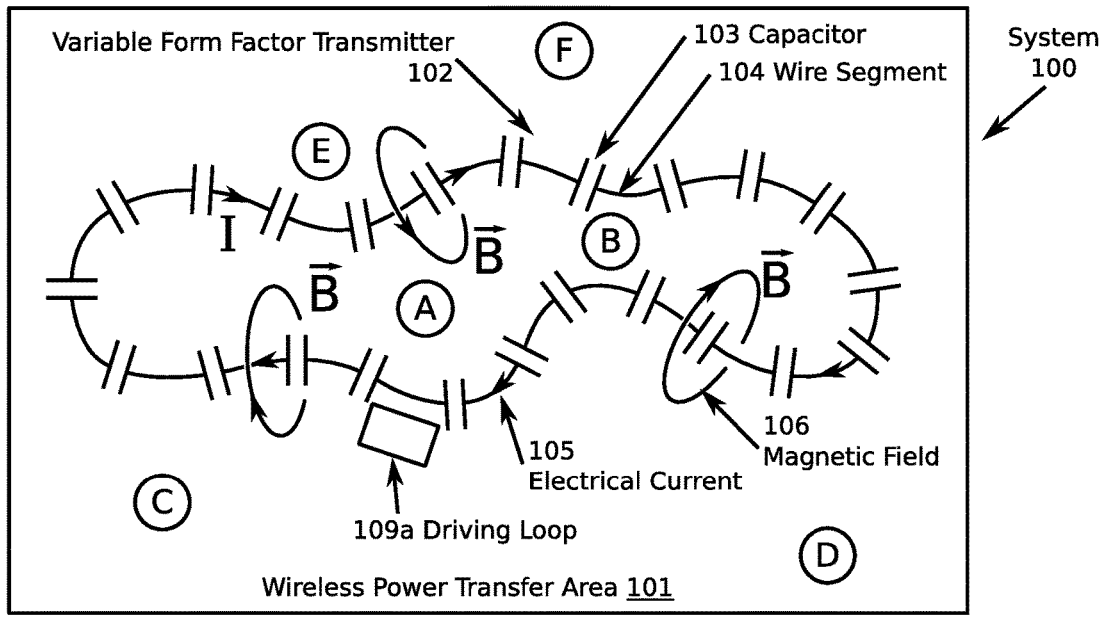

In one or more embodiments, instead of the direct connection to the power source (108), the variable form factor transmitter (102) receives power from the power source (108) using inductive coupling via a driving loop (109a). FIG. 1B shows a schematic diagram of the example system (100) in the inductive coupling power configuration. Details of receiving power via the driving loop (109a) are described in reference to FIG. 1C below.

Figure 1C:
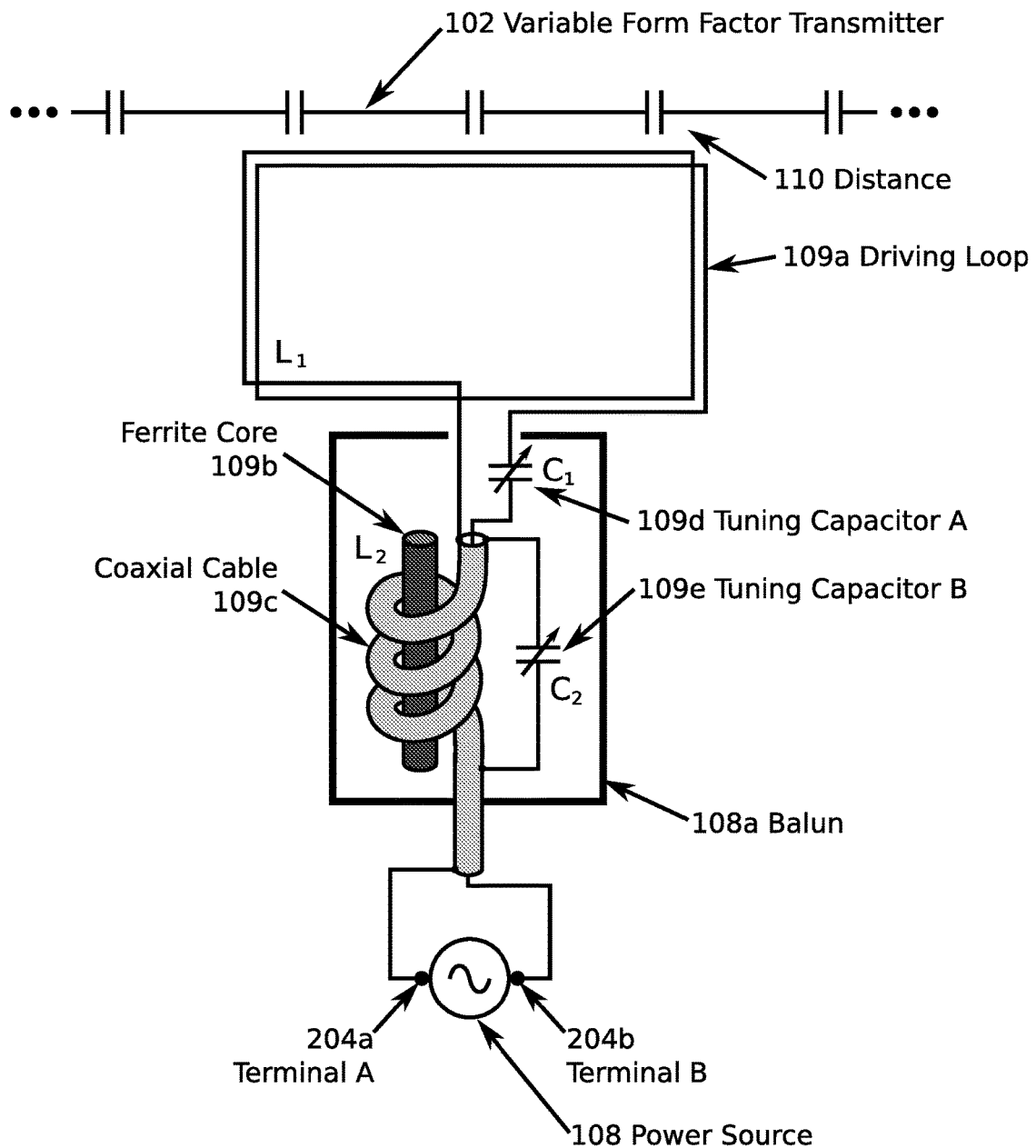

FIG. 1C shows a schematic diagram of supplying power via the driving loop (109a) depicted in FIG. 1B above. In one or more embodiments, one or more of the modules and elements shown in FIG. 1C may be omitted, repeated, and/or substituted. Accordingly, embodiments of the invention should not be considered limited to the specific arrangements of modules shown in FIG. 1C.

As shown in FIG. 1C, the driving loop (109a) includes one or more loops of conducting wire (e.g., having an inductance $L_1$) that are coupled to the power source (108) via a balun (108a). The balun (108a) includes a tuning capacitor A (109d) (e.g., having a variable capacitance $C_1$), a tuning capacitor B (109e) (e.g., having a variable capacitance $C_2$), and a coaxial cable (109c) (e.g., coiled around a ferrite core (109b) and having an inductance $L_2$). Specifically, the driving loop (109a) is placed at a distance (110) from the variable form factor transmitter (102) such that the power source (108) supplies power to the variable form factor transmitter (102) via electromagnetic coupling across the distance (110). In one or more embodiments, the tuning capacitor B (109e) is tuned to resonate with inductance $L_2$ of the ferrite core (109b) to form a parallel resonant LC circuit, which imposes a high impedance between the two opposite ends of the coaxial cable (109c). Further, the tuning capacitor A (109d) is used to tune the resonant frequency of the driving loop (109a) to match the frequency of the RF power source (108). The distance (110) between the driving loop (109a) and the variable form factor transmitter (102) may be adjusted in order to match the apparent input impedance of variable form factor transmitter (102) to the impedance of the coaxial cable (109c), and the output impedance of the RF power source (108).

Figure 2A:
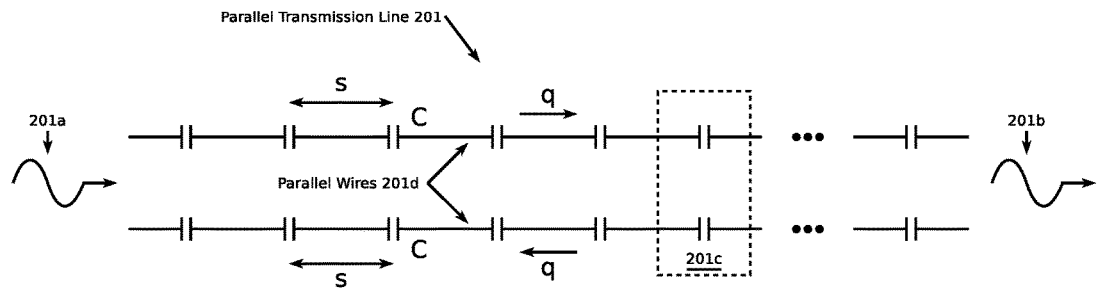
FIGS. 2A, 2B, 2C, 2D, 2E, 2F, 2G, and 2H show schematic diagrams for illustrating an example variable form factor transmitter in accordance with one or more embodiments of the invention.

FIG. 2A shows a schematic diagram of a parallel-wire transmission line (201) in accordance with one or more embodiments of the invention. In one or more embodiments, one or more of the modules and elements shown in FIG. 2A may be omitted, repeated, and/or substituted. Accordingly, embodiments of the invention should not be considered limited to the specific arrangements of modules shown in FIG. 2A.

As shown in FIG. 2A, the sinusoid-shaped icons (201a) and (201b) represent electromagnetic waves propagating along the parallel-wire transmission line (201). The parallel-wire transmission line (201) is composed of two parallel wires (201d) each having wire segments joined by capacitors, where s denotes the length of each wire segment, C denotes the capacitance of each capacitor, and q denotes the electric charge displacement along the parallel-wire transmission line (201). In the context that the two parallel wires (201d) conduct RF current (e.g., electrical current (105) depicted in FIG. 1A), each wire of two parallel wires (201d) is also referred to as a conductor wire throughout this document. The distance between the sinusoid-shaped icons (201a) and (201b) corresponds to the length of the parallel-wire transmission line (201) while the spacing between the two parallel string of capacitors corresponds to the width of the parallel-wire transmission line (201). While the length of the parallel-wire transmission line (201) may be comparable to a length of other dimension of the wireless power transfer area (101), the width of the parallel-wire transmission line (201) may range from less than one centimeter to a width or other other dimension of the wireless power transfer area (101). In one or more embodiments, the parallel-wire transmission line (201) corresponds to a portion of the variable form factor transmitter (102) depicted in FIG. 1A above. In other words, two sections of the string of distributed capacitor depicted in FIG. 1A may be disposed parallel to each other. Generally, the electric charge, q, displaced along the parallel-wire transmission line (201) is a function of a position along the parallel-wire transmission line (201) and time. The corresponding charge density (i.e., electric charge per unit length), $\rho_\lambda$, and electrical current, I, are given by Eq. (1) below for the parallel-wire transmission line (201). In Eq. (1), x and t denote the position along the parallel-wire transmission line (201) and time, respectively.

$$\rho_\lambda = q' = \frac{\partial q}{\partial x}, I = \dot{q} = \frac{\partial q}{\partial t} \qquad \text{Eq. (1)}$$

TABLE 1 shows additional definitions of variables used in the equations throughout this document.

TABLE 1

- c = capacitance per unit length
- l = inductance per unit length
- C = capacitance of each joining capacitor
- s = length of each segment
- q = charge displacement
- $\rho_\lambda$ = charge density
- $\lambda$ = wavelength in free space
- I = current
- $U_j$ = energy stored in the two joining capacitors
- $u_E$ = electrical energy stored per unit length
- $u_B$ = magnetic energy stored per unit length
- u = asymptotic velocity
- $\omega_0$ = cutoff frequency
- $u_p$ = phase velocity
- $u_g$ = group velocity The electrical energy, $U_j$, stored in a pair of adjoining capacitors (e.g., capacitor pair (201c)) in the parallel-wire transmission line (201) is given by Eq. (2) below.

$$U_j = 2 \cdot \frac{1}{2}\frac{q^2}{C} = \frac{q^2}{C} \qquad \text{Eq. (2)}$$

In the scenario where s is substantially less than the spatial variation of q, the stored energy, $U_j$, divided by the segment length, s, may be considered as a density of energy stored in the capacitors, C, along the parallel-wire transmission line (201). Let c denote the stray capacitance per unit length between the two parallel wires of the parallel-wire transmission line (201). The total electrical energy, $u_E$, stored per unit length along the parallel-wire transmission line (201) is given by Eq. (3) below.

$$u_E = \frac{1}{2}\frac{\rho_\lambda^2}{C} + \frac{q^2}{sC} \qquad \text{Eq. (3)}$$

The total magnetic energy, $u_B$, stored per unit length along the parallel-wire transmission line (201) is given by Eq. (4) below.

$$u_B = \frac{1}{2}lI^2 \qquad \text{Eq. (4)}$$

Accordingly, the Lagrangian of the parallel-wire transmission line (201) is given by Eq. (5) below.

$$\mathcal{L} = U_E - U_B = \int dx\, (u_E - u_B) \qquad \text{Eq. (5)}$$

$$= \int dx \left[ \frac{1}{2}\frac{\rho_\lambda^2}{C} + \frac{q^2}{sC} - \frac{1}{2}lI^2 \right]$$

$$= \int dx \left[ \frac{-1}{2}q\frac{q''}{C} + \frac{q^2}{sC} - \frac{1}{2}l\,\dot{q}^2 \right]$$

The generalized momentum $\pi$, the Euler-Lagrange equation of motion, and the wave equation of the parallel-wire transmission line (201) are given by Eq. (6), Eq. (7), and Eq. (8) below.

$$\pi = \partial_{\dot{q}} \mathcal{L} = -l\dot{q} \qquad \text{Eq. (6)}$$

$$\dot{\pi} = \partial_q \mathcal{L} = -l\ddot{q} = -\frac{q''}{c} + 2\frac{q}{sC} \qquad \text{Eq. (7)}$$

$$-\ddot{q} = -\frac{q''}{lc} + 2\frac{q}{lsC} \qquad \text{Eq. (8)}$$

Based on the wave equation Eq. (8), the dispersion relation for the parallel-wire transmission line (201) is given by Eq. (9a), Eq. (9b), and Eq. (9c) below.

$$v \equiv \frac{1}{\sqrt{lc}} \qquad \text{Eq. (9a)}$$

$$\omega_0 = \frac{1}{\sqrt{lsC/2}} \qquad \text{Eq. (9b)}$$

$$\omega^2 = v^2 k^2 + \omega_0^2 \qquad \text{Eq. (9c)}$$

In Eq. (9a), Eq. (9b), and Eq. (9c), ω represents an angular frequency, k represents a wave number, v represents an asymptotic wave velocity as defined in Eq. (9a), and $\omega_o$ represents a cut off angular frequency as defined in Eq. (9b). In particular, the cut off angular frequency $\omega_o$ is independent of the length, and varies logarithmically with the width, of the parallel-wire transmission line (201). In one or more embodiments, one or more wire segments with associated capacitors of the parallel-wire transmission line (201) are detachable. Accordingly, the parallel-wire transmission line (201) may be re-configured, without substantially changing $\omega_o$, by the user to change the total length according to the dimension of the wireless power transfer area (101).

Figure 3A:
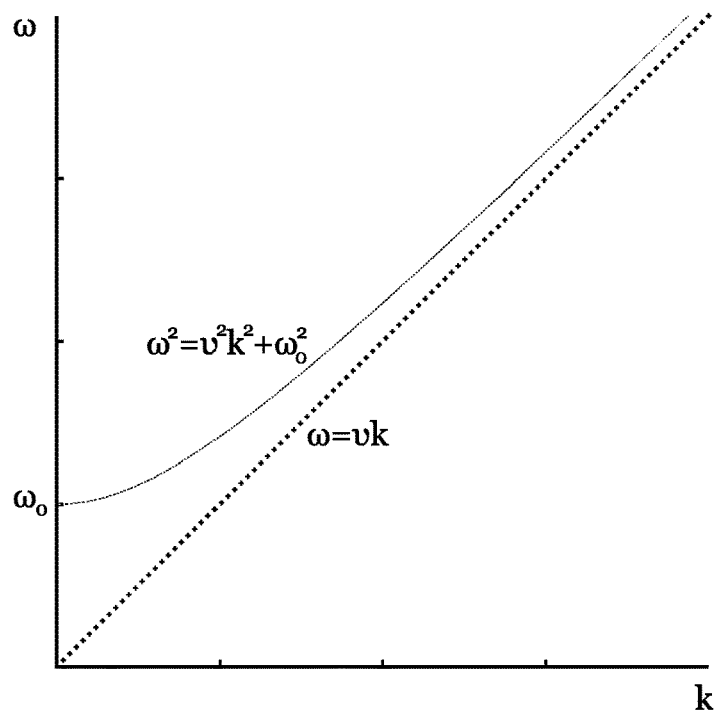
FIGS. 3A, 3B, 3C, 3D, and 3E show example characteristics of an example variable form factor transmitter in accordance with one or more embodiments of the invention.

Based on Eq. (9c), FIG. 3A shows a plot of angular frequency, ω, versus wave number, k, to illustrate the dispersion relation for the parallel-wire transmission line (201). In addition, the phase velocity, $v_p$, and group velocity, $v_g$, are given in Eq. (10a) and Eq. (10b) below.

$$v_p = \frac{\omega}{k} \qquad \text{Eq. (10a)}$$

$$v_g = \frac{\partial \omega}{\partial k} \qquad \text{Eq. (10b)}$$

Note that as the wave number k asymptotically approaches 0, the phase velocity $v_p$ asymptotically approaches infinity, the group velocity $v_g$ asymptotically approaches 0, and the angular frequency ω asymptotically approaches $\omega_0$.

Figure 2B:
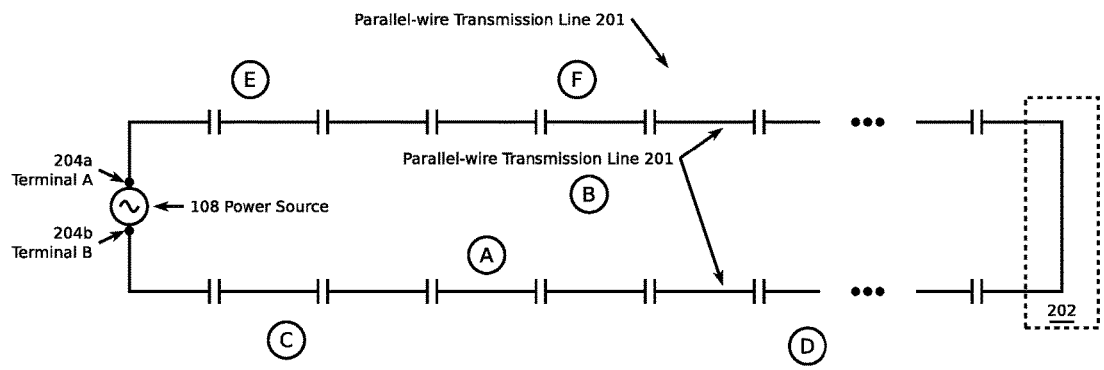

FIG. 2B shows a schematic diagram of the parallel-wire transmission line (201) driven by the RF power source (108) in accordance with one or more embodiments of the invention. In one or more embodiments, one or more of the modules and elements shown in FIG. 2B may be omitted, repeated, and/or substituted. Accordingly, embodiments of the invention should not be considered limited to the specific arrangements of modules shown in FIG. 2B.

As shown in FIG. 2B, the parallel-wire transmission line (201) is driven by the RF power source (108) connected via the terminal A (204a) and terminal B (204b). Further, the parallel-wire transmission line (201) is terminated by an electrically conducting connection (202) and operating at the characteristic frequency $\omega_o$. In one or more embodiments of the invention, the electrically conducting connection (202) may be substituted by a variable capacitor or other electronic component, which may be used to fine tune the characteristic frequency of the parallel-wire transmission line (201).

In one or more embodiments of the invention, the configuration of the parallel-wire transmission line (201) shown in FIG. 2B approximates the variable form factor transmitter (102) depicted in FIG. 1A above. Similar to FIG. 1A, receiver devices (e.g., denoted as circular icons labeled as A, B, C, D, E, and F) are disposed about the parallel-wire transmission line (201) shown in FIG. 2B. The approximation is particularly suitable for the scenario where the wireless power transfer area (101) has an elongated shape and where the string of distributed capacitors of the variable form factor transmitter (102) is arranged into a pair of parallel lines according to the elongated shape of the wireless power transfer area (101). As described below, the characteristic frequency of the variable form factor transmitter (102) corresponds to $\omega_o$ described in reference to FIG. 2A above and is substantially independent of the length, and varies logarithmically with the width, of the parallel-wire transmission line (201).

In the configuration shown in FIG. 2B, the standing wave along the parallel-wire transmission line (201), as excited by the RF power source (108), has an infinite phase velocity. Therefore, the voltages and currents along the parallel-wire transmission line (201) are all in phase at different positions of the parallel-wire transmission line (201). In other words, the effective electrical length of the parallel-wire transmission line (201) equals zero regardless of the physical length of the parallel-wire transmission line (201). In the scenario where there is no energy loss in the parallel-wire transmission line (201), the input impedance of the parallel-wire transmission line (201) as presented to the RF power source (108) equals zero regardless of the physical length of the parallel-wire transmission line (201). In other words, the parallel-wire transmission line (201) is equivalent to an RLC circuit (not shown) resonant at $\omega_o$, regardless whether the physical length of the parallel-wire transmission line (201) is much shorter or much longer than the free-space wavelength (e.g., based on the transmission medium of the wireless power transfer area (101)) of the driving frequency, i.e., $\omega_o$. Accordingly, the parallel-wire transmission line (201) driven by the RF power source (108) and terminated by the electrically conducting connection (202) may be used as a resonant power source for wireless power transfer to induce resonances of receiver devices that are placed in the vicinity of the parallel-wire transmission line (201). In particular, the resonant receiver devices couple to the electric and/or magnetic fields generated by the standing wave of the parallel-wire transmission line (201) and receive power from the electric and/or magnetic fields.

In one or more embodiments, the resonant receiver devices receive power from a near electromagnetic field of the parallel-wire transmission line (201). Even if the physical length of the parallel-wire transmission line (201) is much longer than the free-space wavelength (e.g., based on the transmission medium of the wireless power transfer area (101)) of the driving frequency, the power supplied from the RF power source (108) is substantially retained in the parallel-wire transmission line (201) for transferring to the nearby resonant receiver devices without being lost to far field radiation. The quality factor of the parallel-wire transmission line due to radiation loss depends only on the wire separation and wire radius, not on the length.

Figure 2C:
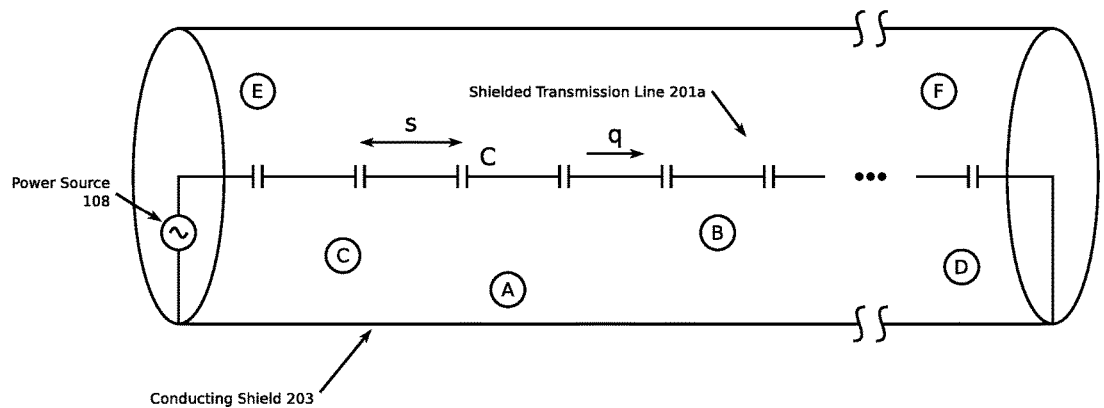

FIG. 2C shows a variation of the parallel-wire transmission line (201) with distributed capacitance in which one of the conductor wires forms a conducting shield (203) that surrounds the other conductor wire, hereafter referred to as the shielded transmission line (201a). For example, the conducting shield (203) may be substantially cylindrical. The shielded transmission line (201a) shown in FIG. 2C operates by the same principle as the parallel-wire transmission line (201) shown in FIG. 2B above, except the distributed capacitance is only placed on the center conductor. In some configurations, the center conductor may not be concentric with the outer conductor (i.e., conducting shield 203). Further, the cross sections of the center conductor and outer conductor (i.e., conducting shield 203) may not be circular.

In one or more embodiments of the invention, the configuration of the shielded transmission line (201a) shown in FIG. 2C approximates the variable form factor transmitter (102) depicted in FIG. 1A above. Similar to FIG. 1A, receiver devices (e.g., denoted as circular icons labeled as A, B, C, D, E, and F) are disposed about the parallel-wire transmission line (201) shown in FIG. 2C. The approximation is particularly suitable for the scenario where the wireless power transfer area (101) corresponds to the interior space within a conductive enclosure, such as within a metal pipeline, an airframe of an airplane or space shuttle, etc. The characteristic frequency of the variable form factor transmitter (102), as shown in FIG. 2C, corresponds to $\omega_o$ described in reference to FIGS. 2A and 2B above and is substantially independent of the length, and varies logarithmically with the diameter, of the conducting shield (203). The characteristic frequency of the shielded transmission line (201a) shown in FIG. 2C is given by Eq. (11). Note that this differs from Eq. (9b) by a factor of $\sqrt{2}$ due to the fact that only one of the conductor wires includes distributed capacitors.

$$\omega_0 = \frac{1}{\sqrt{lsC}} \qquad \text{Eq. (11)}$$

Figure 3B:
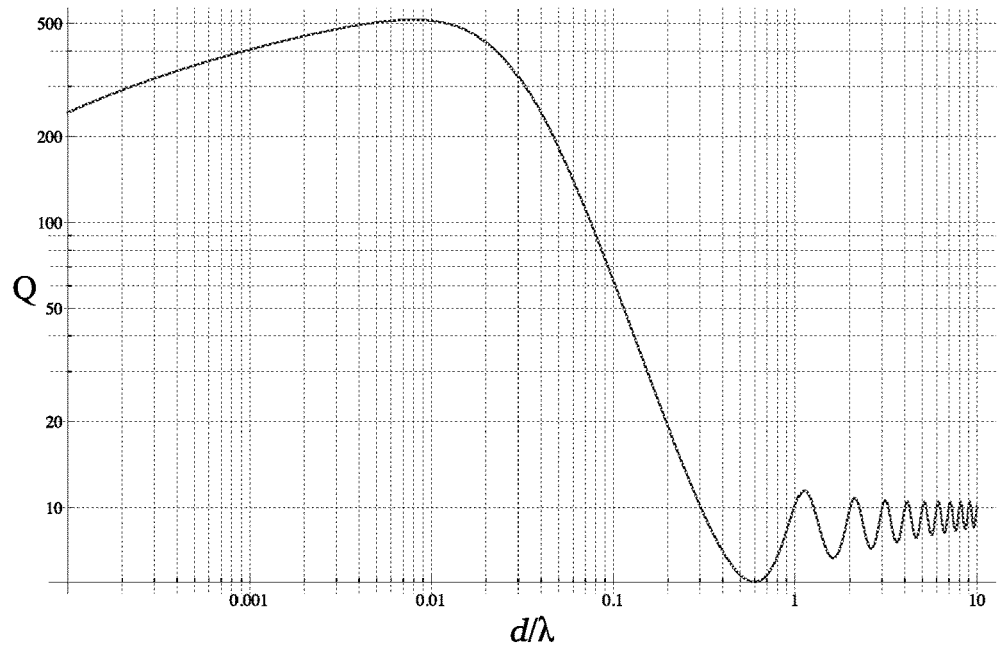

FIG. 3B shows a plot of the quality factor, Q, of a parallel-wire transmission line (e.g., shown in FIG. 2A or FIG. 2B) of arbitrary length, consisting of 14 AWG copper wire, driven at 6.78 MHz, as a function of the separation, d, (between the two wires) divided by the free-space wavelength $\lambda$. For wire separations large relative to the free-space wavelength, the Q is suppressed due to radiation loss. However, for wire separations small compared to the free-space wavelength, the radiation is suppressed and the loss is dominated by ohmic losses in the copper wire.

Note that the shielded transmission line (201) has no radiative loss due to the fact that the conducting shield (203) completely encloses the internal electromagnetic fields.

In contrast, while a conducting wire loop driven by the RF power source (108), described in reference to FIG. 2D below, may also transfer power to resonant receiver devices in the vicinity, the efficiency of the power transfer is decreased due to far field radiation as the dimension of the conducting wire loop increases to approach or exceed the free-space wavelength of the driving frequency. FIG. 3C shows a plot of the quality factor, Q, of a circular loop consisting of 14 AWG copper wire, driven at 6.78 MHz, as a function of the loop radius a divided by the free-space wavelength $\lambda$. Note that the Q becomes low, and therefore the efficiency of wireless power transfer is suppressed, as the loop radius becomes large relative to the free-space wavelength.

Figure 2D:
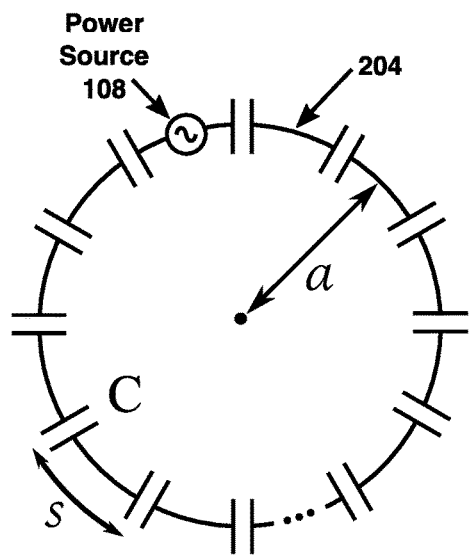
Figure 3C:
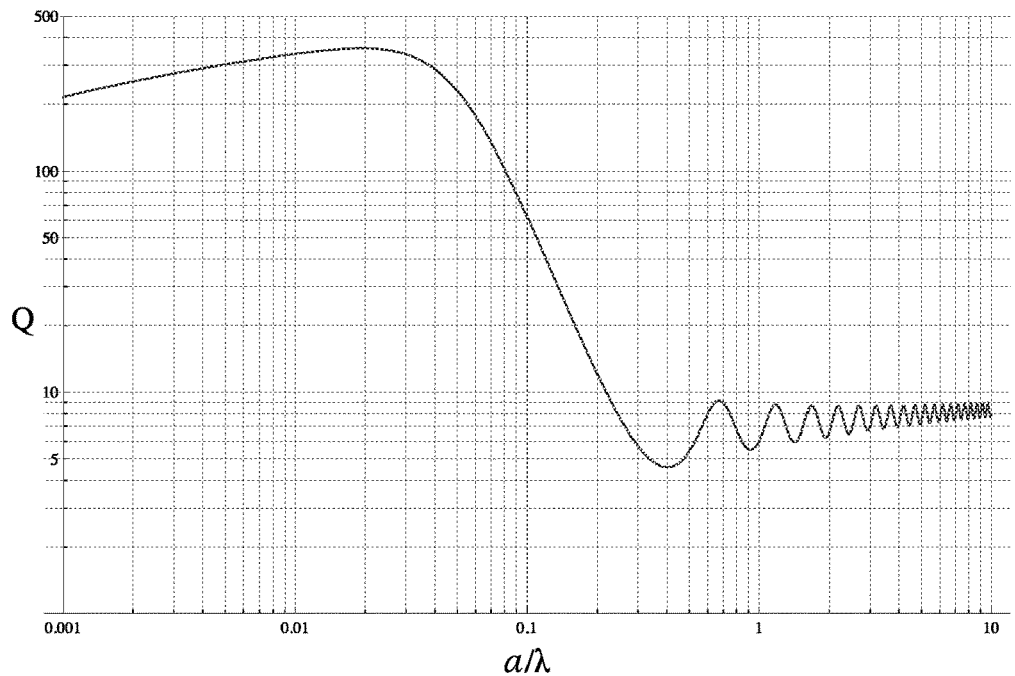

FIG. 2D shows a schematic diagram of a wire loop (204) having distributed capacitors and driven by the RF power source (108) in accordance with one or more embodiments of the invention. In one or more embodiments, one or more of the modules and elements shown in FIG. 2D may be omitted, repeated, and/or substituted. Accordingly, embodiments of the invention should not be considered limited to the specific arrangements of modules shown in FIG. 2D.

In one or more embodiments, the wire loop (204) has a circular loop radius, a, and a wire radius (corresponding to a gauge of the wire), b, (not shown) and is composed of wire segments of length s joined by a number of capacitors, C. In one or more embodiments of the invention, the configuration of the wire loop (204) shown in FIG. 2D approximates the variable form factor transmitter (102) depicted in FIG. 1A above. The approximation is particularly suitable for the scenario where a particular shape of the wireless power transfer area (101) matches the circular form factor of the variable form factor transmitter (102). As is described below, the characteristic frequency of the variable form factor transmitter (102) corresponds to a resonant frequency $\omega_o$ of the wire loop (204) and is substantially independent of the width and/or length (i.e., form factor) of the wire loop (204).

The inductance, L, the total capacitance, $C_{tot}$, and the resonant angular frequency, $\omega_o$, of the wire loop (204) are given by Eq. (12a), Eq. (12b), and Eq. (12c) below.

$$L = \mu a \left[ \ln\left(\frac{8a}{b}\right) - 2 \right] \quad \text{Eq. (12a)}$$

$$C_{tot} = \frac{C}{N} = \frac{C}{(2\pi a/s)} \quad \text{Eq. (12b)}$$

$$\omega_0^2 = \frac{1}{LC_{tot}} = \frac{1}{\mu a \left[ \ln\left(\frac{8a}{b}\right) - 2 \right] \cdot \frac{s}{2\pi a} \cdot C}$$

$$= \frac{1}{\frac{\mu}{2\pi} sC \left[ \ln\left(\frac{8a}{b}\right) - 2 \right]} \quad \text{Eq. (12c)}$$

In Eq. (12a), Eq. (12b), and Eq. (12c), N denotes the number of wire segments or capacitors, C, in the wire loop (204) and μ denotes the electromagnetic permeability of the transmission medium in the wireless power transfer area (101). In one or more embodiments, the resonant angular frequency, $\omega_o$, depends only weakly on the radius, a, of the wire loop (204) or the wire radius, b. In one or more embodiments, one or more wire segments with associated capacitors of the wire loop (204) are detachable. Accordingly, the wire loop (204) may be reconfigured, without substantially changing the resonant angular frequency $\omega_o$, by the user to change the loop radius, a, according to the dimensions of the wireless power transfer area (101).

Unlike the parallel-wire transmission line (201) shown in FIG. 2A above, the wire loop (204) becomes an efficient far field radiator as the radius, a, becomes comparable to or exceeds the free-space wavelength (e.g., based on the transmission medium of the wireless power transfer area (101)) of the driving frequency, i.e., $\omega_o$. The radiation resistance (i.e., effective series resistance due to far field radiation) $R_{rad}$ of a closed loop of wire carrying a uniform current is given by the double integral over the wire path shown Eq. (13a) below.

$$R_{rad} = \frac{\zeta \kappa^2}{4\pi} \int dr_1 \cdot dr_2 \frac{\sin(\kappa|r_1 - r_2|)}{\kappa|r_1 - r_2|} \quad \text{Eq. (13a)}$$

$$\zeta = \sqrt{\frac{\mu}{\varepsilon}} \quad \text{Eq. (13b)}$$

$$\kappa \equiv \frac{\omega}{c} = \frac{2\pi}{\lambda} \quad \text{Eq. (13c)}$$

Figure 3D:
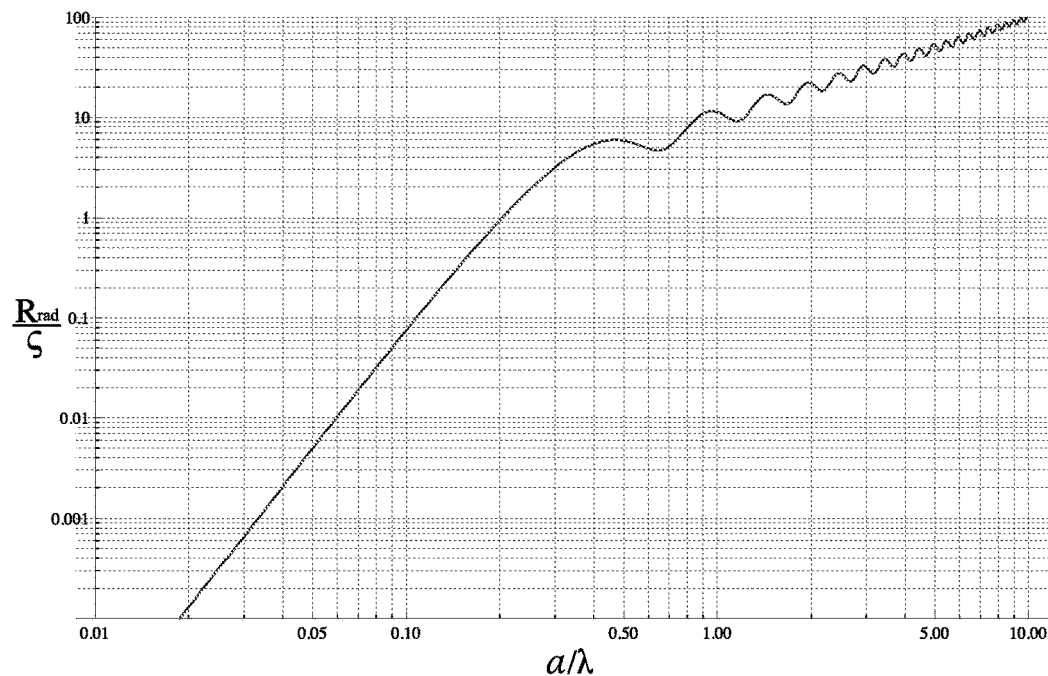

In Eq. (13a), based on the transmission medium of the wireless power transfer area (101), ζ is the impedance of free space, and κ is the free-space wavenumber. Based on Eq. (13a) applied to the wire loop (204), FIG. 3D shows a plot of radiation resistance divided by the impedance of free space as a function of radius divided by wavelength. As can be seen from FIG. 3D, the radiation resistance has the asymptotic forms for large and small loop radius given in Eq. (14) below.

$$\frac{R_{rad}}{\zeta} \approx \frac{8\pi^5}{3} \left(\frac{a}{\lambda}\right)^4, \, a << \lambda \quad \text{Eq. (14)}$$

$$\frac{R_{rad}}{\zeta} \approx \pi^2 \left(\frac{a}{\lambda}\right), \, a >> \lambda$$

The quality factor, Q, of the loop due to radiation is equal to the ratio of the inductive reactance, $\omega_o L$, divided by the total series resistance, R, which includes the radiation resistance, $R_{rad}$. As the radiation resistance increases, the quality factor decreases, causing the efficiency of the wireless power transfer to decrease.

For the circular wire loop (204) shown in FIG. 2D, Eq. (12c) applies where $\omega_0 = \sqrt{2\pi/(\mu s C(\ln(8a/b)-2))}$ with a being the loop radius and b being the wire radius. For the parallel-wire transmission line (201) shown in FIG. 2B, Eq. (9b) applies and it can be shown that $\omega_0 = \sqrt{2\pi/(\mu s C \ln(d/b))}$, with d being the width of the parallel-wire transmission line and b being the wire radius. The characteristic frequencies, $\omega_0$, have similar values for both circular loop and parallel-wire configurations if ln(a/b)≈ln(d/b). In this manner, a single variable form factor transmitter (102) may be manufactured for use in both elongated-shaped service area and circular-shaped service area based on the user adapted elongated form factor or circular form factor. In other words, based on the wire diameter, b, used to manufacture the variable form factor transmitter (102), the user may select the loop radius, a, and the parallel-wire transmission line width, d, such that ln(a/b)≈ln(d/b). In this manner, one single variable form factor transmitter manufactured in the factory can be configured into either a parallel-wire form factor depicted in FIG. 2B or a circular form factor depicted in FIG. 2D to supply power to the same set of receiving devices that are tuned to the particular resonant frequency, $\omega_0$.

Figure 2E:
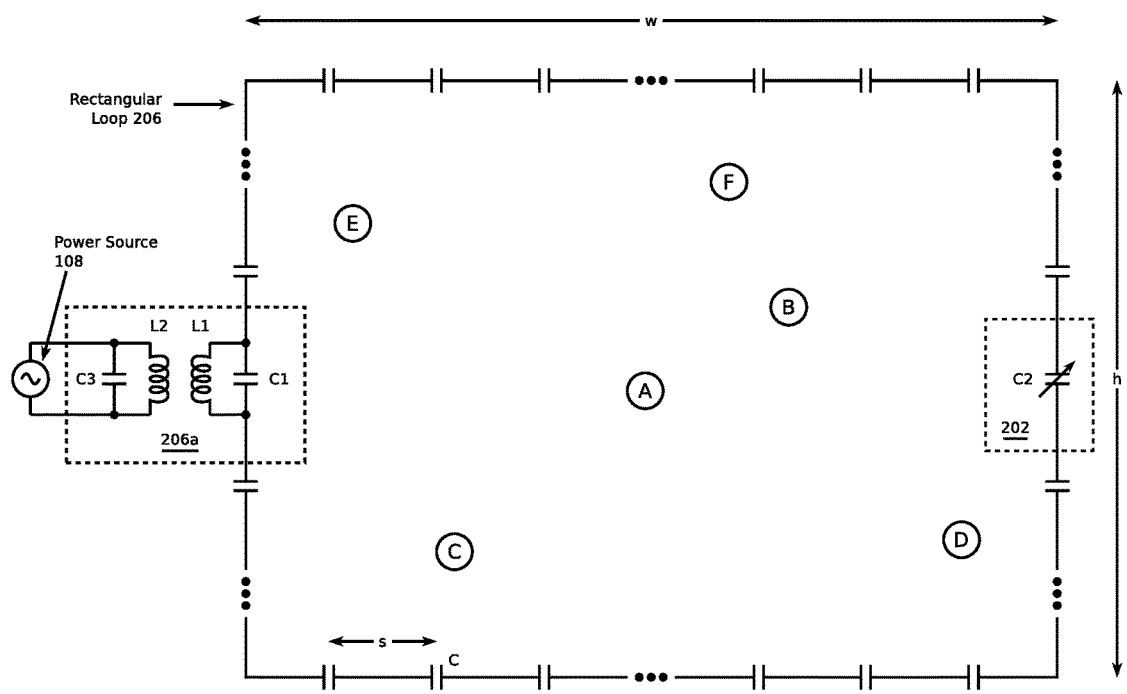

FIG. 2E shows a schematic diagram of a rectangular loop (206) having distributed capacitors and driven by the RF power source (108) in accordance with one or more embodiments of the invention. In one or more embodiments of the invention, the configuration of the rectangular loop (206) approximates the variable form factor transmitter (102) depicted in FIG. 1A above. Similar to FIG. 1A, receiver devices (e.g., denoted as circular icons labeled as A, B, C, D, E, and F) are disposed about the rectangular loop (206) shown in FIG. 2E. For example, the rectangular loop (206) may correspond to the parallel-wire transmission line (201) shown in FIG. 2B that has been adapted by a user to fit a rectangular-shaped wireless power transfer area. In another example, the rectangular loop (206) may correspond to the wire loop (204) shown in FIG. 2D that has been adapted by a user to fit a rectangular-shaped wireless power transfer area. As shown in FIG. 2E, the rectangular loop (206) is driven by the RF power source (108) using a transformer coupling scheme. In particular, the transformer (206a) includes a capacitor $C_2$ in parallel to the primary coil $L_1$ and a capacitor $C_1$ in parallel to the secondary coil $L_1$. In addition, the electrically conducting connection (202) shown in FIG. 2B is substituted by a capacitor $C_2$. The capacitance values of the capacitors $C_1$, $C_2$, and $C_3$ may be adjusted in the factory and/or by the user for impedance matching between the power source (108) and the rectangular loop (206) and for tuning the resonant frequency of the rectangular loop (206).

Figure 2F:
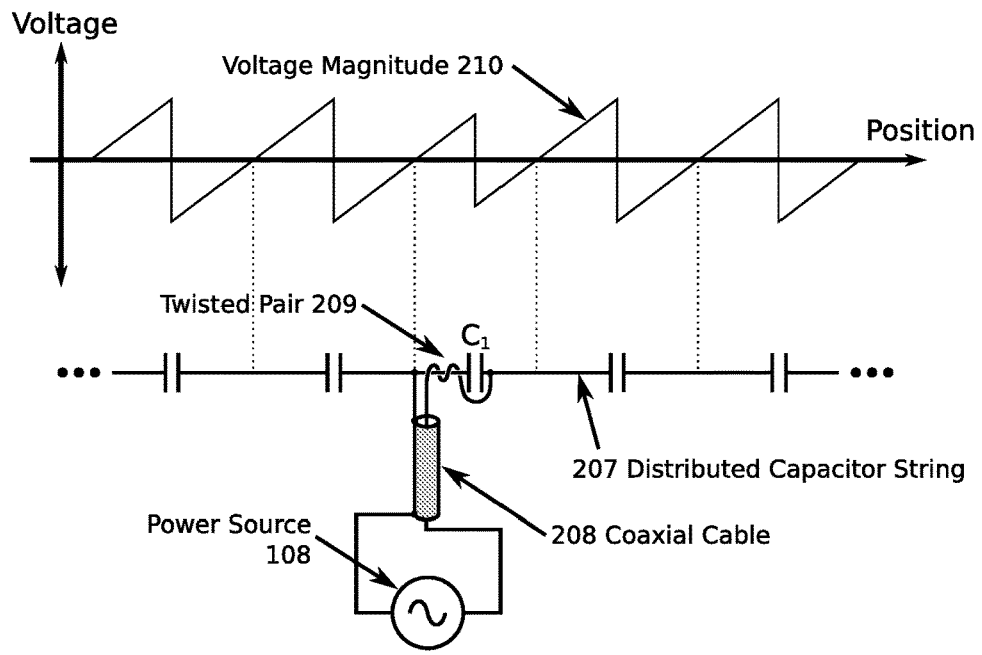

FIG. 2F shows a schematic diagram of connecting the power source (108) using a capacitive coupling scheme. In particular, the power source (108) is connected to a distributed capacitor string (207), via a coaxial cable (208) and a twisted pair (209), at opposite terminals of a tuning capacitor $C_1$. The value of the tuning capacitor $C_1$ may be adjusted in the factor or by the user to provide a proper impedance match to both the RF power source (108) and the coaxial cable (208). By attaching the shield of the coaxial cable (208) to a voltage node of the distributed-capacitor string (207), the outer connector of the coaxial cable (208) is maintained at ground potential.

In one or more embodiments, the distributed capacitor string (207) may correspond to a portion of the parallel-wire transmission line (201) shown in FIGS. 2B and 2C, a portion of the wire loop (204) shown in FIG. 2D, or a portion of the rectangular loop (206) shown in FIG. 2E. The voltage magnitude relative to ground (210) induced by the power source (108), is shown as a function of the position along the distributed capacitor string (207).

Figure 2G:
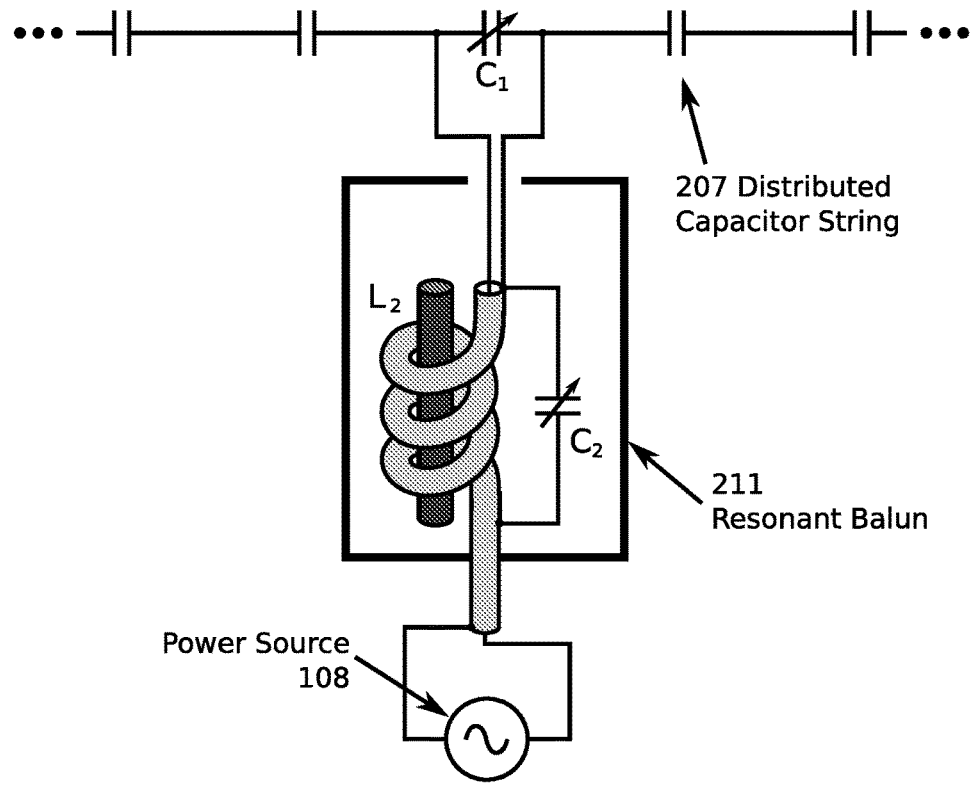

FIG. 2G shows a schematic diagram for connecting the power source (108) to the variable form factor transmitter using an alternative capacitive coupling scheme. As shown in FIG. 2G, a resonant balun (211) is used to connect the power source (108) to the tuning capacitor, $C_1$.

Figure 3E:
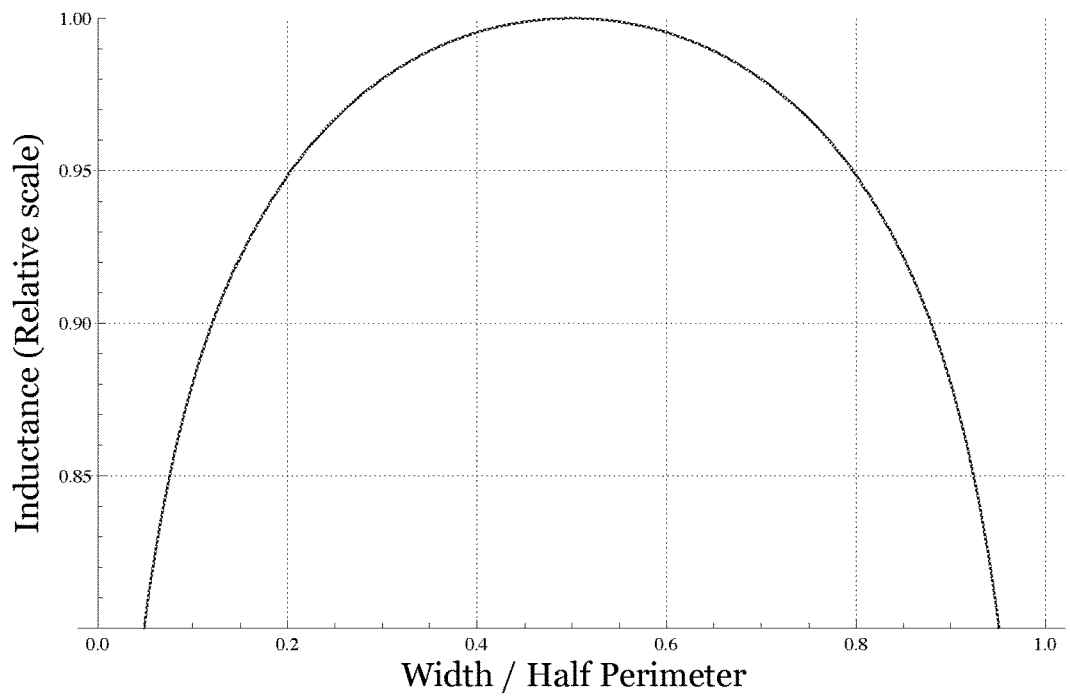

FIG. 3E is a plot of inductance as a function of the aspect ratio (represented by width/half-perimeter) of a rectangular loop (e.g., rectangular loop (206) depicted in FIG. 2E above), made from 83 feet of 14 AWG wire, and driven at 6.78 MHz. The rectangular loop with the range of aspect ratios shown in FIG. 3E represents various shapes the wire loop (204) shown in FIG. 2D may be adapted by the user to fit any wireless power transfer area. The plot shows the inductance of the rectangular loop as the perimeter (i.e., corresponding to the circumference of the wire loop (204)) is held fixed but the aspect ratio is varied. As can be seen from the plot, the inductance varies less than 20% as the aspect ratio is varied over a wide range between 0.05 and 0.95. Accordingly, the characteristic frequency of the wire loop (204) varies less than 10% while being adapted into a rectangular loop over a wide range of aspect ratios. This demonstrates the relative insensitivity of the resonant frequency of the loop with distributed capacitance to variations in the adapted form factor.

Referring back to the discussion of FIG. 1A, in one or more embodiments of the invention, the system (100) provides wireless power transfer across the wireless power transfer area (101) based on the ISM band. In the scenario where the variable form factor transmitter (102) is approximated by the parallel-wire transmission line (201) shown in FIG. 2A, 2B, or 2C, the values of the wire segment length s, the inductance per unit length l, and the capacitor C may be chosen in the factory, based on Eq. (9b), to maintain the resonant angular frequency $\omega_0$ of the parallel-wire transmission line (201) equal to the angular frequency of the RF power source, which may be within the type A frequency range (i.e., 6.765 MHz-6.795 MHz) defined in the ITU Radio Regulations Article 5, footnote 5.138.

In the scenario where the variable form factor transmitter (102) is approximated by the wire loop (204) shown in FIG. 2D, the values of the wire segment length, s, and the capacitor, C, may be chosen in the factory, based on Eq. (12c), to maintain the resonant angular frequency $\omega_0$ of the wire loop (204) equal to the angular frequency of the RF power source, which may be within the type A frequency range (i.e., 6.765 MHz-6.795 MHz) defined in the ITU Radio Regulations Article 5, footnote 5.138.

In one or more embodiments of the invention, the aforementioned manufacturing tolerance is controlled such that the resulting capacitance range, length range, and inductance range do not cause the resonant angular frequency $\omega_0$ to deviate from the type A frequency range (i.e., 6.765 MHz-6.795 MHz). In addition for both scenarios described above, approximation error exists due to physical difference between the user adapted form factor of the variable form factor transmitter (102) and the simplified form factor of the parallel-wire transmission line (201) or the wire loop (204). In one or more embodiments of the invention, to compensate for the aforementioned manufacturing tolerance and the approximation error, the input impedance and the characteristic frequency of the variable form factor transmitter (102) may be adjustable in the factory as well as by the user.

Figure 2H:
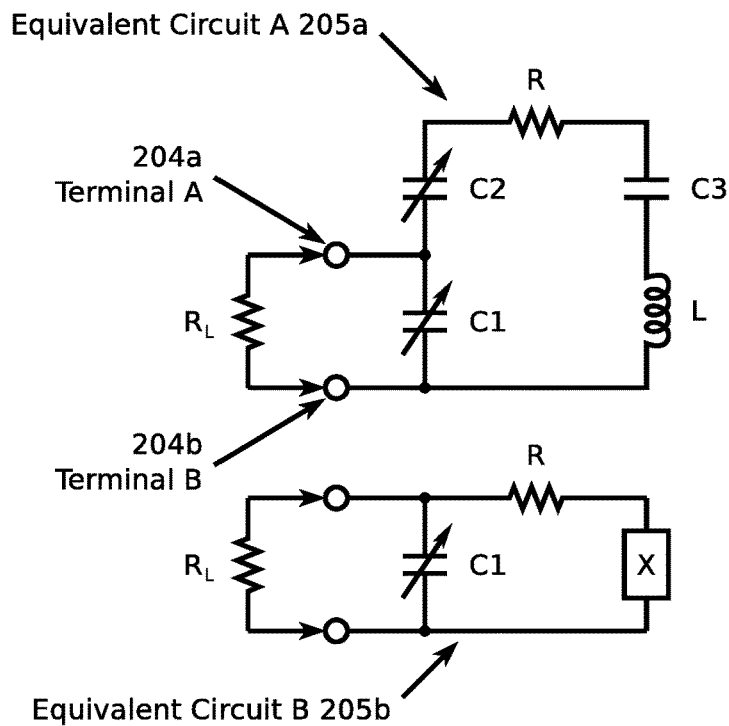

FIG. 2H shows schematic diagrams of an equivalent circuit A (205a) and an equivalent circuit B (205b) of the variable form factor transmitter (102). For optimal power transfer from the power source (108), the input impedance of the variable form factor transmitter (102) is matched to the output impedance (represented by the resistor $R_L$) of the power source (108). The resistor R is an effective series resistance representing all sources of loss (e.g., ohmic loss, radiation loss, dielectric loss, etc.) of the variable form factor transmitter (102). The variable capacitor $C_1$ determines the apparent input impedance of the variable form factor transmitter (102) at its resonant frequency, while the variable capacitor $C_2$ sets the resonant frequency.

The equivalent circuit B (205b) corresponds to a simplified form of the equivalent circuit A (205a) where $C_2$, $C_3$, and L have been combined into a single reactance, $\chi$. The input impedance of the variable form factor transmitter (102) is equal to $R_L$ when $C_1$ has the value given by Eq. (15).

$$C_1 = \frac{1}{\omega_0 R_L} \sqrt{\frac{R_L}{R} - 1} \qquad \text{Eq. (15)}$$

For the case where $R_L < R$, the transformer coupling scheme shown in FIG. 2E may be used. For the case where $R_L \geq R$, the capacitive coupling scheme shown in FIG. 2F may be used.

Figure 4:
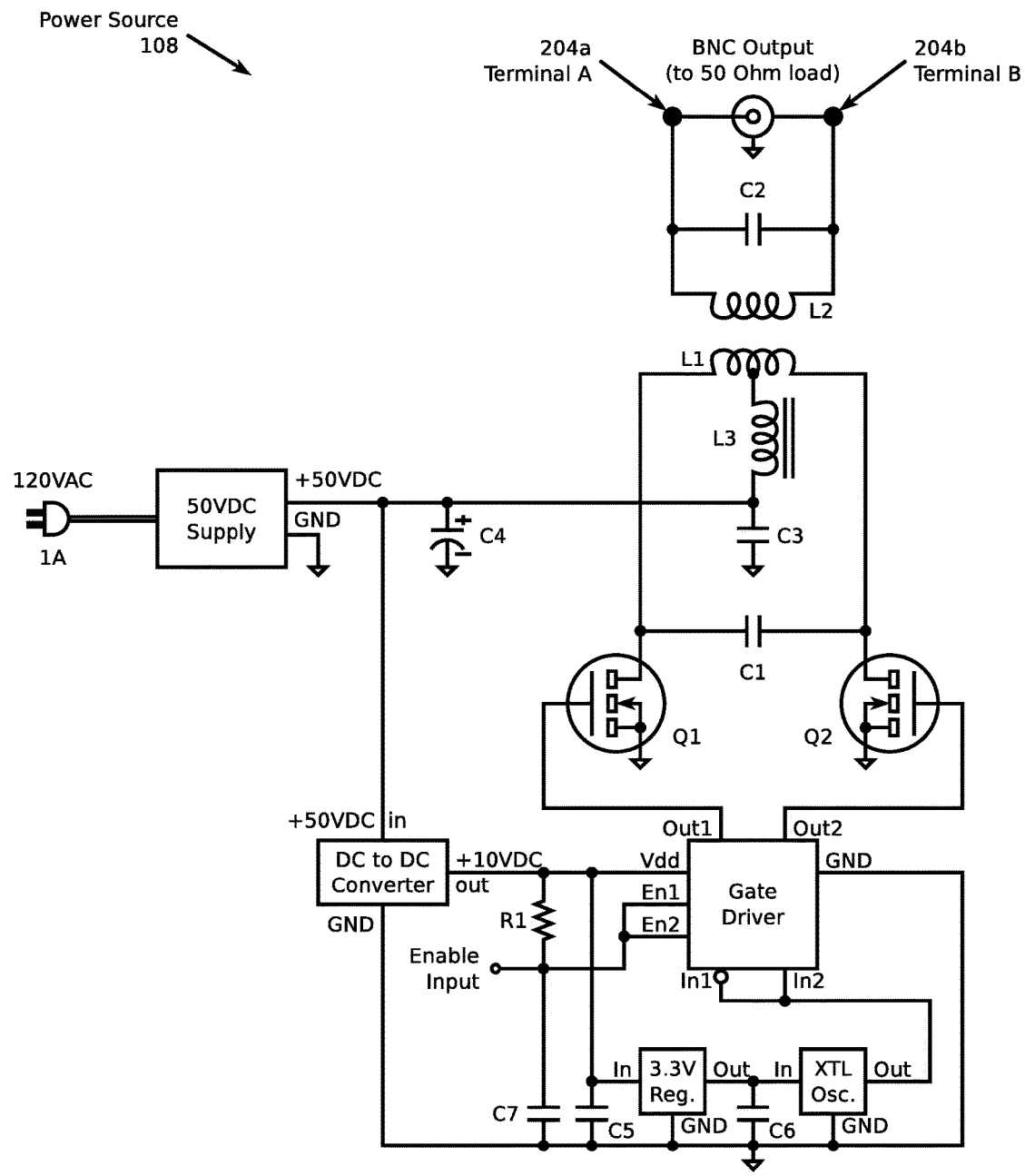
FIG. 4 shows a schematic diagram of an example radio frequency (RF) power source in accordance with one or more embodiments of the invention.

FIG. 4 shows a schematic diagram of an example RF power source in accordance with one or more embodiments of the invention. In particular, the example RF power source shown in FIG. 4 may operate based on the ISM band as the power source (108) depicted in FIGS. 1A, 1C, 2B, 2C, and 2D above. Specifically, the example RF power source shown in FIG. 4 includes the terminal A (204a) and terminal B (204b) that correspond to the two terminals of the power source (108) depicted in FIGS. 1A, 1C, 2B, 2C, and 2D above. The schematic diagram specifies capacitance values, inductance values, and resistance values of various RLC circuit components and commercial part numbers of various integrated circuit components. In one or more embodiments, one or more of the modules and elements shown in FIG. 4 may be omitted, repeated, and/or substituted. Accordingly, embodiments of the invention should not be considered limited to the specific arrangements of modules shown in FIG. 4.

Figure 5A:
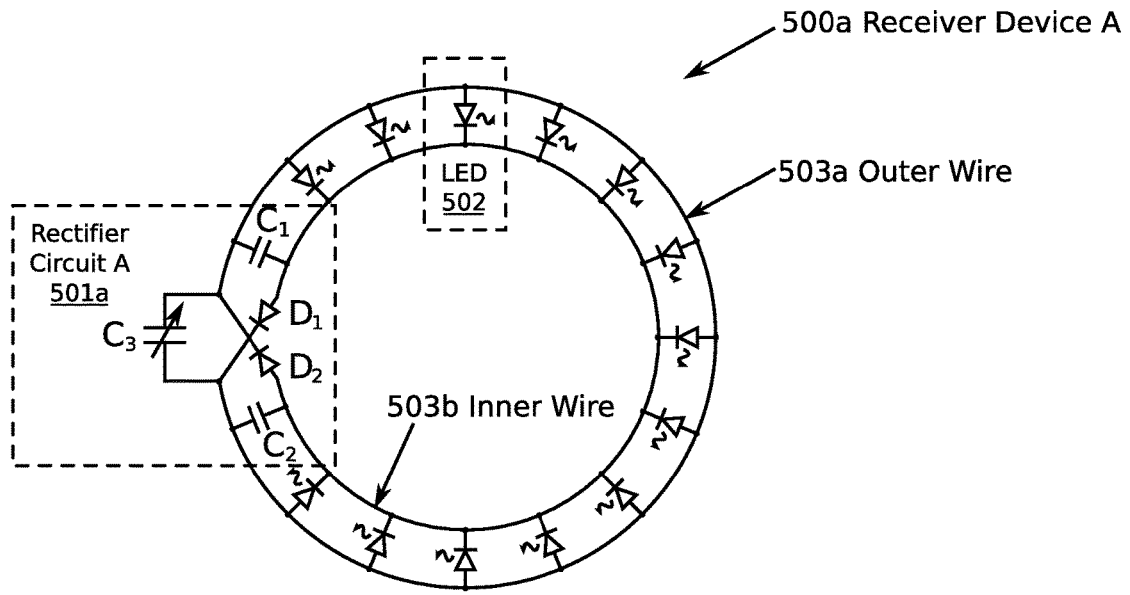
FIGS. 5A, 5B, and 5C show a schematic diagram of an example receiver device in accordance with one or more embodiments of the invention.

FIG. 5A shows a schematic diagram of an example receiver device A (500a) in accordance with one or more embodiments of the invention. In one or more embodiments, one or more of the modules and elements shown in FIG. 5A may be omitted, repeated, and/or substituted. Accordingly, embodiments of the invention should not be considered limited to the specific arrangements of modules shown in FIG. 5A.

As shown in FIG. 5A, the receiver device A (500a) includes multiple light emitting diodes (LEDs) (e.g., LED (502)) that are connected in parallel to form an LED string. The two ends of the LED string are connected to a rectifier circuit A (501a) to form a loop. For example, the loop may be a circular loop used as a mobile LED lighting device used within the wireless power transfer area (101) depicted in FIG. 1A above. In one or more embodiments of the invention, the rectifier circuit A (501a) includes capacitors $C_1$, $C_2$, and $C_3$ and rectifying diodes $D_1$ and $D_2$. When the receiver device A (500a) is in the presence of the oscillating magnetic fields, the changing magnetic flux through the loop of the LED string induces a voltage difference between the two ends of the LED string. The induced voltage difference oscillates with time. The capacitance $C_3$ is adjusted to bring the LED string into resonance with the oscillating magnetic fields to enhance the induced oscillating voltage. The rectifying diodes $D_1$ and $D_2$ rectify the induced oscillating voltage to produce a DC voltage difference between the outer wire (503a) and inner wire (503b) of the LED string thereby deliver power to the parallel-connected LEDs (e.g., LED (502)). The capacitors $C_1$ and $C_2$ act as RF bypass capacitors to maintain the outer wire (503a) and inner wire (503b) of the LED string appear shorted to the RF current. The configuration of the receiver device A (500a) limits the loop voltage by the combined forward voltage drop across the LEDs in series with the rectifying diode $D_1$ or $D_2$, which improves safety to the user.

Figure 5B:
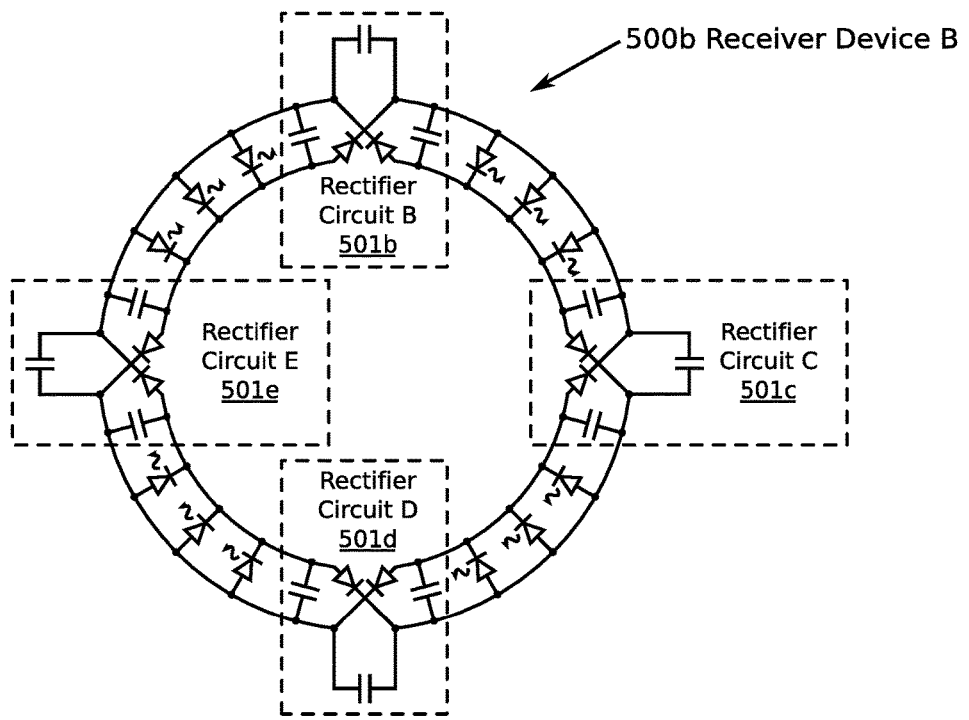

Similar to FIG. 5A, FIG. 5B shows an example receiver device B (500b), which is a larger version of the receiver device A (500a) that has multiple rectifier circuits (i.e., rectifier circuit B (501b), rectifier circuit C (501c), rectifier circuit D (501d), rectifier circuit E (501e)). The operation of the receiver device B (500b) is substantially the same as the receiver device A (500a). The number of segments in the receiver device B (500b) may be chosen to provide an optimal impedance match to the load, i.e., the parallel-connected LEDs.

Figure 5C:
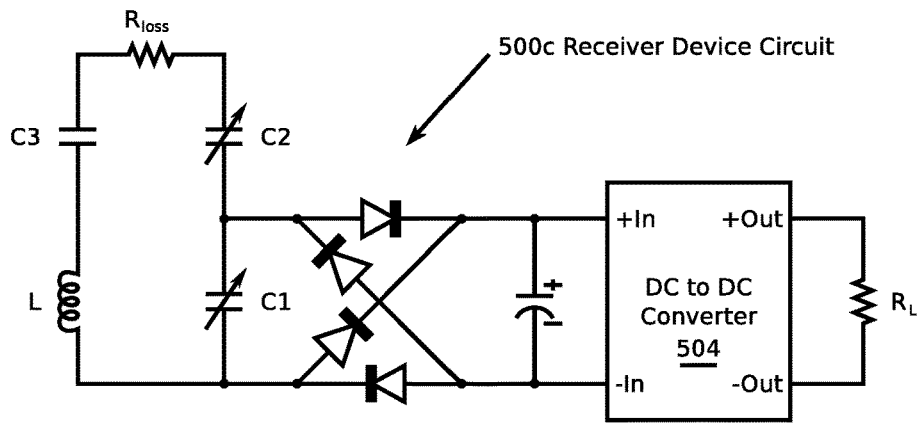

In addition to FIGS. 5A and 5B, FIG. 5C shows a schematic diagram of other example receiver devices.

FIG. 5C shows a schematic diagram of an example receiver device circuit (500c) in accordance with one or more embodiments of the invention. In one or more embodiments, the receiver device circuit (500c) is employed in various types of receiver devices having different shapes, sizes, form factors, etc. for various different types of mobile or stationery applications within the wireless power transfer area (101) depicted in FIG. 1A above. In one or more embodiments, at least the inductor, L, of the receiver device circuit (500c) is placed within the wireless power transfer area (101) for receiving the wireless power transfer. The remaining components shown in FIG. 5C are configured to convert the received wireless power to suitable format to be consumed by a load, represented by the resistance, $R_L$.

As shown in FIG. 5C, the inductor, L, along with capacitors, $C_1$, $C_2$, and $C_3$, are tuned to resonate at the characteristic frequency of the variable form factor transmitter (102) and the RF power source (108) described in reference to FIGS. 1A through 2G above. The value of capacitor $C_1$ is chosen to provide an impedance match between the resonant receiver and the input of the DC-to-DC converter (504). The DC-to-DC converter (504) transforms the rectified voltage into a constant voltage to drive the load, $R_L$. The DC-to-DC converter (504) allows the receiver device circuit (500c) to present a constant voltage to the load $R_L$ even in situations where the receiver device circuit (500c) is moved through regions of varying magnetic field strength within the wireless power transfer area (101). Note that the load $R_L$ need not be a linear device, i.e., a device with a linear voltage versus current relation. Examples of load $R_L$ include, but are not limited to, LED's, microcontrollers, motors, sensors, actuators, etc.

In one or more embodiments of the invention, the receiver device A (500a), receiver device B (500b), or receiver device circuit (500c) may receive power wirelessly from any electromagnetic transmitter, such as a dipole transmitter (e.g., magnetic dipole transmitter), a loop antenna with distributed capacitance, a parallel-wire transmission line with distributed capacitance, a shielded transmission line with distributed capacitance, etc. In one or more embodiments of the invention, the receiver device A (500a), receiver device B (500b), and/or receiver device circuit (500c) are placed within the wireless power transfer area (101) as the receiver device (A), receiver device (B), receiver device (C), receiver device (D), receiver device (E), or receiver device (F) to receive power wirelessly from the variable form factor transmitter (102).

Figure 6:
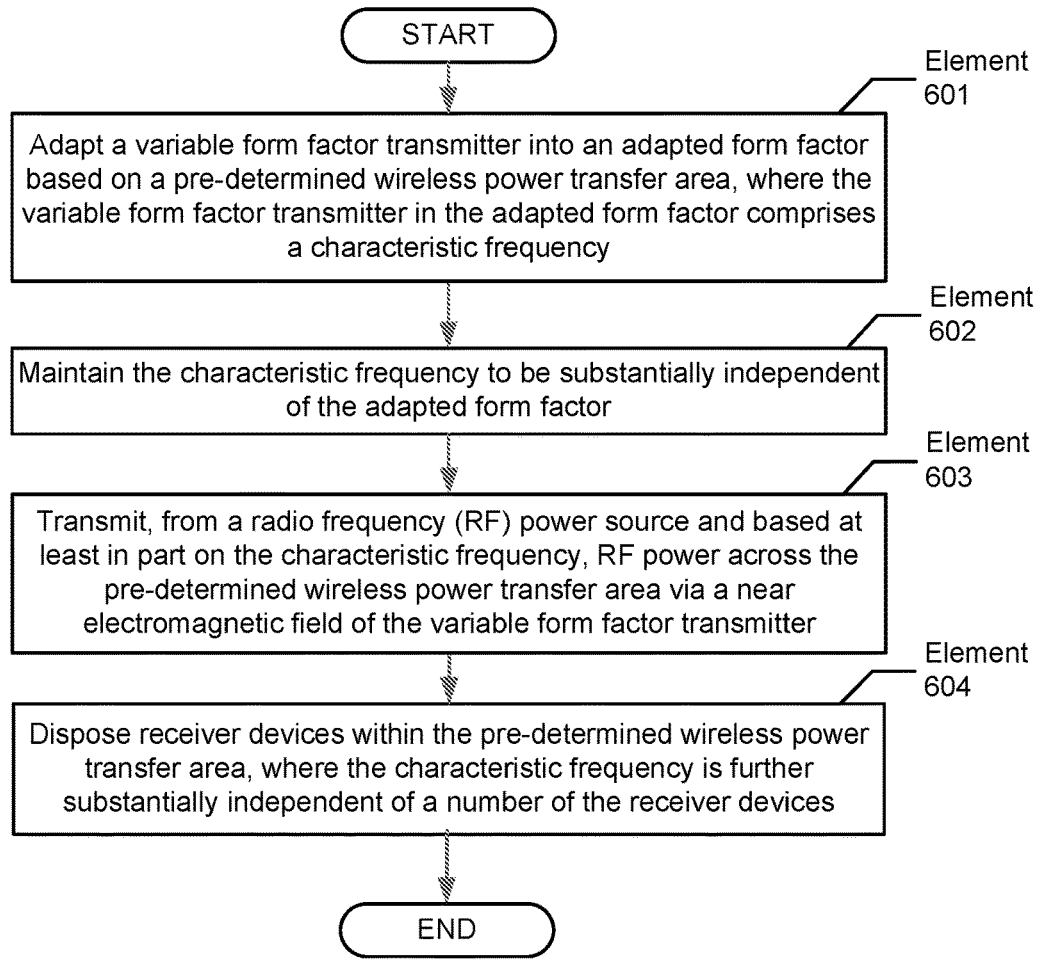
FIG. 6 shows a flowchart in accordance with one or more embodiments of the invention.

FIG. 6 shows a flowchart in accordance with one or more embodiments of the invention. In one or more embodiments of the invention, the method of FIG. 6 may be practiced using the example system and the example variable form factor transmitter described in reference to FIGS. 1A, 1C, 2A, 2B, and/or 2D above. In one or more embodiments of the invention, one or more of the elements shown in FIG. 6 may be omitted, repeated, and/or performed in a different order than that shown in FIG. 6. Accordingly, the specific arrangement of steps shown in FIG. 6 should not be construed as limiting the scope of the invention.

Initially, in Element 601, a variable form factor transmitter is adapted into an adapted form factor based on a pre-determined wireless power transfer area. In one or more embodiments, the variable form factor transmitter in the adapted form factor has a characteristic frequency.

In Element 602, the characteristic frequency of the variable form factor transmitter is maintained to be substantially independent of the adapted form factor while adapting the variable form factor transmitter.

In one or more embodiments, the variable form factor transmitter includes a number of capacitors connected in series via wire segments into a string of distributed capacitors.

In one or more embodiments, adapting the variable form factor transmitter includes adjusting a length of the string of distributed capacitors based on a dimension of the pre-determined wireless power transfer area by cutting or adjoining the wire segments. In particular, the characteristic frequency is substantially independent of an adjusted length of the string of distributed capacitors.

In one or more embodiments, adapting the variable form factor transmitter includes arranging the string of distributed capacitors to occupy a multi-dimensional surface based on a shape of the pre-determined wireless power transfer area. In particular, the characteristic frequency is substantially independent of a form factor of the multi-dimensional surface.

In one or more embodiments, adapting the variable form factor transmitter includes folding the string of distributed capacitors into a pair of parallel lines based on an elongated shape of the pre-determined wireless power transfer area. In particular, the characteristic frequency is substantially independent of a form factor of the pair of parallel lines.

In one or more embodiments, adapting the variable form factor transmitter includes disposing the string of distributed capacitors within (e.g., along a center line of) a cylindrical-shaped conducting shield. One end of the string of distributed capacitors is connected to the cylindrical-shaped conducting shield as a return path to the power source. In particular, the characteristic frequency is substantially independent of the length of the capacitors connected in series.

In one or more embodiments, a dimensional tolerance of the adapted form factor is determined to ensure that a range of the wireless power transfer covers the pre-determined wireless power transfer area. In particular, the characteristic frequency is maintained within a pre-determined range while adapting the variable form factor transmitter within the dimensional tolerance.

In Element 603, from a radio frequency (RF) power source and based at least in part on the characteristic frequency, RF power is transmitted across the pre-determined wireless power transfer area via a near electromagnetic field of the variable form factor transmitter. In one or more embodiments, a driving wire loop is disposed in proximity to the variable form factor transmitter. In particular, the driving wire loop is energized by the RF power source and, in turn, energizes the variable form factor transmitter.

In one or more embodiments, the RF power source is connected to a matching capacitor whose value is chosen to provide an impedance match between the RF power source and the variable form factor transmitter. In one or more embodiments, the RF power source is connected to the matching capacitor through a resonant balun. In one or more embodiments, the RF power source is connected to the matching capacitor through an unbalanced coaxial transmission line whose shield is attached to a voltage node of the variable form factor transmitter.

In Element 604, receiver devices are disposed within the pre-determined wireless power transfer area. In one or more embodiments, a portion of the RF power transmitted via the variable form factor transmitter from the RF power source is received by the receiver device. In particular, the characteristic frequency is further substantially independent of a number or placement of the receiver devices.

Therefore, the following is claimed:

1. A wireless power receiver that receives power wirelessly from a variable form factor transmitter that generates an oscillating magnetic field, comprising:
   a receiving coil circuit, comprising:
      a diode string formed by an outer wire, an inner wire, and a plurality of diodes, each of the plurality of diodes having a first end coupled to the outer wire and a second end coupled to the inner wire such that each of the diodes are connected in parallel with one another, the diode string forming a circular loop; and
      a rectifier circuit coupled to ends of the diode string, the rectifier circuit comprising:
         a plurality of capacitors, wherein at least one of the capacitors is configured to bring the diode string into resonance with the oscillating magnetic field and enhance an induced oscillating voltage; and
         a plurality of rectifying diodes that rectify the induced oscillating voltage to produce a DC voltage difference between the outer wire and the inner wire of the diode string, thereby powering the diodes connected in parallel.

2. The wireless power receiver of claim 1, wherein:
   the first end of each of the diodes coupled to the outer wire is an anode; and
   the second end of each of the diodes coupled to the inner wire is a cathode.

3. The wireless power receiver of claim 2, wherein the plurality of diodes are a plurality of light emitting diodes (LEDs).

4. The wireless power receiver of claim 3, wherein the wireless power receiver is implemented in a light emitting diode (LED) lighting device.

5. The wireless power receiver of claim 1, wherein:
   the plurality of capacitors comprise a first bypass capacitor ($C_1$) and a second bypass capacitor ($C_2$) that cause the outer wire and the inner wire of the diode string to short a radio frequency (RF) current; and
   the at least one of the capacitors configured to bring the diode string into resonance is a third capacitor ($C_3$).

6. The wireless power receiver of claim 5, wherein the third capacitor ($C_3$) is a variable capacitor.

7. The wireless power receiver of claim 6, wherein the first bypass capacitor ($C_1$) and the second bypass capacitor ($C_2$) are in parallel with each of the diodes.

8. The wireless power receiver of claim 1, wherein a configuration of the receiving coil circuit limits a voltage in the circular loop by a combined forward voltage drop across the diodes in series with one of the rectifying diodes.

9. The wireless power receiver of claim 1, wherein the rectifier circuit is one of a plurality of rectifier circuits in the receiving coil circuit.

10. A device having a wireless power receiver implemented therein that receives power wirelessly from a transmitter coil circuit that generates an oscillating magnetic field, comprising:
    a receiving coil circuit, comprising:
       a diode string formed by a first conductive element, a second conductive element, and a plurality of diodes, each of the plurality of diodes having a first end coupled to the first conductive element and a second end coupled to the second conductive element such that each of the diodes are connected in parallel with one another, the diode string forming a loop; and
       a rectifier circuit coupled to ends of the diode string, the rectifier circuit comprising:
          a plurality of capacitors, wherein at least one of the capacitors is configured to bring the diode string into resonance with the oscillating magnetic field and enhance an induced oscillating voltage; and
          a plurality of rectifying diodes that rectify the induced oscillating voltage to produce a DC voltage difference between the first conductive element and the second conductive element of the diode string, thereby powering the diodes connected in parallel.

11. The device of claim 10, wherein the first conductive element is an outer wire and the second conductive element is an inner wire.

12. The device of claim 10, wherein the loop is a circular loop.

13. The device of claim 10, wherein the transmitter coil circuit is implemented in a variable form factor transmitter.

14. The device of claim 11, wherein:
the first end of each of the diodes is an anode; and
the second end of each of the diodes is a cathode.

15. The device of claim 14, wherein the plurality of diodes are a plurality of light emitting diodes (LEDs).

16. The device of claim 15, wherein the wireless power receiver is implemented in a light emitting diode (LED) lighting device.

17. The device of claim 11, wherein:
the plurality of capacitors comprise a first bypass capacitor ($C_1$) and a second bypass capacitor ($C_2$) that cause the outer wire and the inner wire of the diode string to short a radio frequency (RF) current; and
the at least one of the capacitors configured to bring the diode string into resonance is a third capacitor ($C_3$), wherein the third capacitor ($C_3$) is a variable capacitor.

18. The device of claim 17, wherein the first bypass capacitor ($C_1$) and the second bypass capacitor ($C_2$) are in parallel with each of the diodes.

19. The device of claim 10, wherein a configuration of the receiving coil circuit limits a voltage in the loop by a combined forward voltage drop across the diodes in series with one of the rectifying diodes.

20. The device of claim 10, wherein the rectifier circuit is one of a plurality of rectifier circuits in the receiving coil circuit.

* * * * *